United States Patent
Ninan

(10) Patent No.: US 8,684,546 B2
(45) Date of Patent: Apr. 1, 2014

(54) QUANTUM DOT MODULATION FOR DISPLAYS

(75) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 295 days.

(21) Appl. No.: 13/325,274

(22) Filed: Dec. 14, 2011

(65) Prior Publication Data

US 2012/0155060 A1   Jun. 21, 2012

Related U.S. Application Data

(60) Provisional application No. 61/424,199, filed on Dec. 17, 2010, provisional application No. 61/448,599, filed on Mar. 2, 2011, provisional application No. 61/486,160, filed on May 13, 2011, provisional application No. 61/486,166, filed on May 13, 2011, provisional application No. 61/486,171, filed on May 13, 2011.

(51) Int. Cl.
 *F21V 9/16* (2006.01)

(52) U.S. Cl.
 USPC ............................................. 362/84; 362/612

(58) Field of Classification Search
 USPC ...................... 362/612, 623, 626, 84, 249.02
 See application file for complete search history.

(56) References Cited

U.S. PATENT DOCUMENTS

| | | | |
|---|---|---|---|
| 5,754,159 A | 5/1998 | Wood | |
| 5,774,257 A | 6/1998 | Shibata | |
| 6,031,328 A | 2/2000 | Nakamoto | |
| 6,470,115 B1 | 10/2002 | Yonekubo | |
| 6,608,439 B1 | 8/2003 | Sokolik | |
| 6,864,626 B1 | 3/2005 | Weiss | |
| 7,126,254 B2 | 10/2006 | Nanataki | |
| 7,230,603 B2 | 6/2007 | Yamamoto | |
| 7,430,022 B2 | 9/2008 | Hekstra | |
| 7,465,104 B2 | 12/2008 | Tokui | |
| 7,481,562 B2 | 1/2009 | Chua | |
| 7,486,854 B2 | 2/2009 | Van Ostrand | |

(Continued)

FOREIGN PATENT DOCUMENTS

| | | |
|---|---|---|
| CN | 1732717 | 2/2006 |
| CN | 101243557 | 8/2008 |

(Continued)

OTHER PUBLICATIONS

NanocoTechnologies "The Future of Cadmium Free QD Display Technology" Apr. 2011.

(Continued)

*Primary Examiner* — David V Bruce

(57) ABSTRACT

Modulated light sources are described. A modulated light source may have first light sources that are configured to emit first light, which has first color components that occupy a range that is beyond one or more prescribed ranges of light wavelengths. The modulated light source may also have a light converter that is configured to be illuminated by the first light. The light converter converts the first light into second light. The second light has one or more second color components that are within the one or more prescribed ranges of light wavelengths. Strengths of the one or more second color components in the second light are monitored and regulated to produce a particular point within a specific color gamut.

20 Claims, 7 Drawing Sheets

(56) References Cited

U.S. PATENT DOCUMENTS

| | | |
|---|---|---|
| 7,537,947 B2 | 5/2009 | Smith |
| 7,649,594 B2 | 1/2010 | Kim |
| 7,686,493 B2 | 3/2010 | Roshan |
| 7,696,684 B2 | 4/2010 | Weiss |
| 7,733,017 B2 | 6/2010 | Shapiro |
| 7,746,423 B2 | 6/2010 | Im |
| 7,751,663 B2 | 7/2010 | Van Ostrand |
| 7,768,023 B2 | 8/2010 | Diana |
| 7,858,409 B2 | 12/2010 | Kessels |
| 7,982,812 B2 | 7/2011 | Rho |
| 7,988,311 B2 | 8/2011 | Helbing |
| 8,026,661 B2 | 9/2011 | Weiss |
| 8,035,772 B2 | 10/2011 | Kim |
| 8,075,148 B2 | 12/2011 | Nada |
| 8,164,820 B2 | 4/2012 | Cho |
| 8,210,701 B2 | 7/2012 | Igarashi |
| 8,215,815 B2 | 7/2012 | Meir |
| 8,242,679 B2 | 8/2012 | Noh |
| 8,294,168 B2 | 10/2012 | Park |
| 2005/0269950 A1 | 12/2005 | Giraldo |
| 2006/0109682 A1 | 5/2006 | Ko |
| 2006/0121371 A1 | 6/2006 | Wu |
| 2006/0238103 A1 | 10/2006 | Choi |
| 2006/0244367 A1 | 11/2006 | Im |
| 2007/0029560 A1 | 2/2007 | Su |
| 2007/0096141 A1 | 5/2007 | Chen |
| 2007/0268240 A1 | 11/2007 | Lee |
| 2008/0007172 A1 | 1/2008 | Tan |
| 2008/0136758 A1 | 6/2008 | Ohta |
| 2008/0172197 A1 | 7/2008 | Skipor |
| 2008/0215279 A1* | 9/2008 | Salsbury et al. ............. 702/107 |
| 2008/0225520 A1* | 9/2008 | Garbus ........................ 362/231 |
| 2009/0039448 A1 | 2/2009 | Chuang |
| 2009/0059554 A1 | 3/2009 | Skipor |
| 2009/0091689 A1 | 4/2009 | Rho |
| 2009/0162011 A1 | 6/2009 | Coe-Sullivan |
| 2009/0180055 A1 | 7/2009 | Kim |
| 2009/0190095 A1 | 7/2009 | Ellinger |
| 2009/0194774 A1 | 8/2009 | Huang |
| 2009/0196014 A1 | 8/2009 | Hsiao |
| 2009/0231831 A1 | 9/2009 | Hsiao |
| 2010/0084674 A1 | 4/2010 | Paetzold |
| 2010/0102251 A1 | 4/2010 | Ferrini |
| 2010/0102340 A1 | 4/2010 | Ooya |
| 2010/0117997 A1 | 5/2010 | Haase |
| 2010/0123839 A1 | 5/2010 | Lu |
| 2010/0155749 A1 | 6/2010 | Chen |
| 2010/0172138 A1 | 7/2010 | Richardson |
| 2010/0177091 A1 | 7/2010 | Hioki |
| 2010/0193806 A1 | 8/2010 | Byun |
| 2010/0208172 A1 | 8/2010 | Jang |
| 2010/0208493 A1 | 8/2010 | Choi |
| 2010/0214282 A1 | 8/2010 | Whitehead |
| 2010/0246160 A1 | 9/2010 | Ito |
| 2010/0283036 A1 | 11/2010 | Coe-Sullivan |
| 2010/0283072 A1 | 11/2010 | Kazlas |
| 2011/0205251 A1 | 8/2011 | Auld |
| 2011/0299011 A1 | 12/2011 | Weiss |
| 2011/0312116 A1 | 12/2011 | Weiss |
| 2011/0317097 A1 | 12/2011 | Kim |
| 2012/0050632 A1 | 3/2012 | Shih |
| 2012/0154417 A1 | 6/2012 | Ninan |
| 2012/0154422 A1 | 6/2012 | Ninan |
| 2012/0154464 A1 | 6/2012 | Ninan |
| 2012/0155060 A1 | 6/2012 | Ninan |
| 2012/0274882 A1 | 11/2012 | Jung |
| 2013/0215136 A1 | 8/2013 | Jiao |
| 2013/0335677 A1 | 12/2013 | You |

FOREIGN PATENT DOCUMENTS

| | | |
|---|---|---|
| EP | 1579733 | 9/2005 |
| EP | 1922763 | 5/2008 |
| JP | 2004-325647 | 11/2004 |
| JP | 2009-251129 | 10/2009 |
| KR | 10-2005-0021548 | 3/2005 |
| KR | 10-2005-0046816 | 5/2005 |
| KR | 2008-0041780 | 5/2008 |
| KR | 10-2010-0039910 | 4/2010 |
| KR | 2011-0012246 | 2/2011 |
| KR | 2011-0072210 | 6/2011 |
| KR | 2012-0078883 | 7/2012 |
| KR | 2013-0000506 | 1/2013 |
| WO | 03/021340 | 3/2003 |
| WO | 2004/0104060 | 1/2004 |
| WO | 2004/032523 | 4/2004 |
| WO | 2004/060024 | 7/2004 |
| WO | 2007/020556 | 2/2007 |
| WO | 2009/041594 | 4/2009 |
| WO | 2011/031802 | 3/2011 |
| WO | 2012/082825 | 6/2012 |

OTHER PUBLICATIONS

Quantum Dot LCD HDTV, Dec. 31, 2009.
Nanosys and LG Close to Bringing Quantun Dot Technology to LCD Displays, Nov. 4, 2010.
Green, Kate, "How Quantum Dots Will Make LCDs Better", Dec. 9, 2009, QD Vision.

* cited by examiner

QUANTUM DOT MODULATION FOR DISPLAYS

CROSS-REFERENCE TO RELATED APPLICATIONS

This Application claims benefit of priority to related, co-pending U.S. Provisional Patent Application No. 61/424,199 filed on Dec. 17, 2010; U.S. Provisional Patent Application No. 61/448,599 filed on Mar. 2, 2011; U.S. Provisional Patent Application No. 61/486,160 filed on May 13, 2011; U.S. Provisional Patent Application No. 61/486,166 filed on May 13, 2011; and U.S. Provisional Patent Application No. 61/486,171 filed on May 13, 2011, which are hereby incorporated herein by reference for all purposes as if fully set forth herein.

TECHNOLOGY

The present invention relates generally to light sources, and in particular, to modulated light sources.

BACKGROUND

To display images, a display system may contain light valves and color filters that regulate brightness levels and color values of pixels as the pixels are being illuminated by a light source, such as back light units (BLUs). Typically, light sources such as fluorescent lights or light-emitting diodes illuminate pixels on display panels. The light illuminating the pixels is attenuated by RGB color filters and liquid crystal materials. As a result, brightness levels and color values may be controlled on a pixel-by-pixel basis to express an image based on received image data. In most display systems, a light source illuminates pixels with white light comprising a broad spectrum of wavelengths. As the white light from the light source is color-filtered by color filters and brightness-regulated by different states of a liquid crystal material, a color gamut is formed by all possible color values of the pixels and may be used to support displaying color images.

Most optical configurations of display systems are optimized for one or more intermediate points of a wavelength spectrum. Existing light sources provide diffusive, wide ranges of wavelengths including wavelengths for which the optical configurations are not optimized. Even for those single color light sources, the emitted light in the existing light sources is still composed of wide ranges of wavelengths. As these wide ranges of wavelengths include most wavelengths for which the display systems are not optimized, image inversions, restrictive viewing angles and undesirable color representations and tinges may occur in the display systems with existing light sources so that displayed images suffer from poor quality.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

Figure 1A:
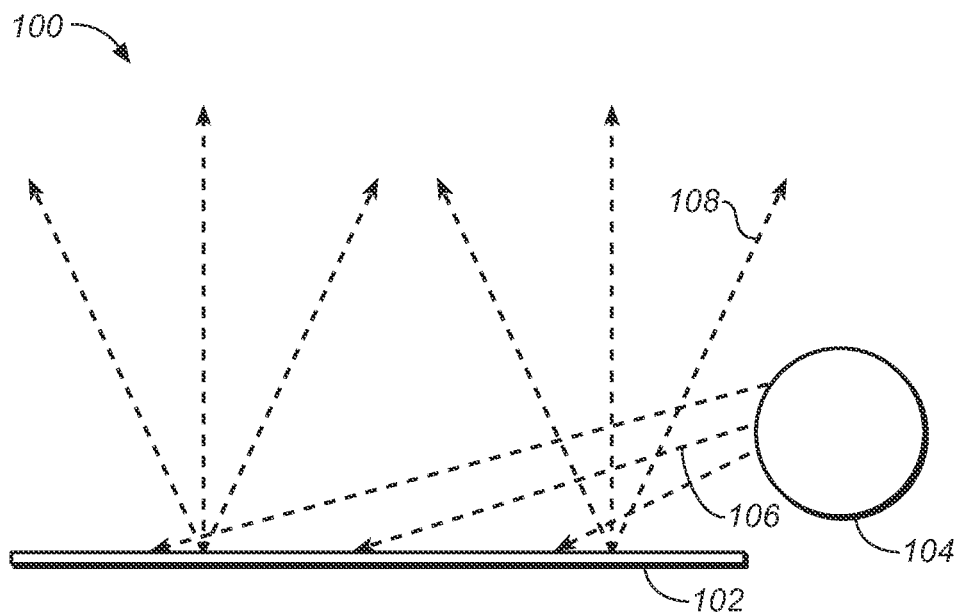
FIG. 1A, FIG. 1B, and FIG. 1C illustrate example modulated light sources, according to possible embodiments of the present invention.

Example possible embodiments, which relate to modulated light sources, are described herein. In the following description, for the purposes of explanation, numerous particular details are set forth in order to provide a thorough understanding of the present invention. It will be apparent, however, that the present invention may be practiced without these particular details. In other instances, well-known structures and devices are not described in exhaustive detail, in order to avoid unnecessarily including, obscuring, or obfuscating the present invention.

Example embodiments are described herein according to the following outline:

1. GENERAL OVERVIEW
2. MODULATED LIGHT SOURCES
3. LIGHT SENSORS AND REGULATORS
4. OPTICAL STACK
5. PATTERNED MODULATION
6. UNPATTERNED MODULATION
7. INTENSITY STATES
8. INTENSITY STATES
9. MODULATED LIGHT SOURCE CONTROLLER
10. EXAMPLE PROCESS FLOW
11. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Techniques for providing modulated light sources that emit light of wavelengths within prescribed ranges of light wavelengths are described. In some possible embodiments, a modulated light source as described herein comprises one or more (light) modulation layers that may be stimulated by incident broadband first light to regenerate second light within prescribed ranges of light wavelengths. The regenerated second light may be used to illuminate image pixels in a display system.

In some possible embodiments, the modulation layers may comprise quantum dots selected based on their physical properties including a property of emitting regenerated light with one or more (e.g., a set number of) color components. Each of the one or more color components is particularly colored light within a prescribed range of (light) wavelengths for a particular color. In some possible embodiments, prescribed ranges of light wavelengths do not vary with operating temperatures of the modulated light source, thereby allowing an accurate composition of light wavelengths in regenerated light across a wide range of operating temperatures. Furthermore, (light) intensities of color components in the regenerated light as described herein may be monitored and regulated. As a result, the regenerated light possesses an accurate profile of light wavelengths and intensities, even when light modulation materials age. A modulated light source as described herein may be used in a high-end display system as a part of an optical stack, which may additionally and/or optionally comprise other optical components such as color filters and/or color enhancer(s), to set pixels at various color values and brightness levels. The accurate profile of light wavelengths and intensities in the regenerated light may result in illuminating pixels in the display system with white light at a particular white point (e.g., D65) in a color gamut supported by the display system. Thus, images created by the display system may be highly accurate in terms of color values.

Under the light modulation techniques as described herein, the maximum number of groups of distinct quantum dots in modulation layers may be configurable as a set number, for example, one, two, three, four, five, six, or another positive integer. While three primary color components may be sufficient in most display systems, modulated light sources as described herein may, but are not limited to, provide more (or fewer) color components than three. In particular, under techniques as described herein, a modulated light source comprising a sufficient number of color components may be used together with other optical components to support a wide color gamut (WCG) in a high quality display system.

Modulation layers in modulated lights sources as described herein may be patterned and/or unpatterned. A fully patterned modulation layer may comprise an array of light conversion units each of which may comprise distinct areas. Each of the distinct areas in a light conversion unit may emit a part of a single color component in regenerated light. A fully unpatterned modulation layer may comprise an array of light conversion units each of which may emit parts of all color components in regenerated light. A patterned modulation layer may also comprise an array of light conversion units each of which may emit a part of some but not all color components in the regenerated light. A mixed patterned modulation layer may also be used and may comprise an array of a mixture of single-color light conversion units, two-color light conversion units, up to fully mixed all-color light conversion units. In some possible embodiments, modulation layers may be disposed before or after LCDs and color filters in optical stacks of display systems.

Through a patterned modulation layer as described herein, first light from broadband light sources may be converted into regenerated second light with particular color components including light with brightened (e.g., highly saturated) color. Thus, a modulated light source as described herein may be used to extend the color gamut of a high quality display system such as an HDR display.

Intensities of regenerated light from each area of a light modulation layer as described herein may be measured and regulated. The absolute intensity of a color component for anyone of the light conversion units in the modulation layer may be regulated. The relative intensity of a color component for the light conversion unit may also be measured and regulated relative to one or more other color components for the light conversion unit. In some possible embodiments, a light conversion unit is coupled to one or more pulse-width modulation (PWM) control signals such that the relative and/or absolute intensities of color components in a modulation layer or a light conversion unit therein may be controlled between a minimum intensity and a maximum intensity. Thus, a modulated light source as described herein is configured to support not only a wide color gamut but also a highly dynamic range of contrast levels, helping a display system to produce highly accurate and detailed images.

A modulated light source as described herein may operate in place of, or alternatively in addition to, other light sources (of a same or different type) in a single system (e.g., a single display system). For example, a modulation layer in the modulated light source may enhance colors and brightness levels for certain pixels based on local color concentrations or other chromatically related features of a given spatial area based on image data, while the pixels may be illuminated by another light source to express colors and brightness levels through, for example, LEDs and color filters. Thus, the display system's sensitivity to the image data may be increased (e.g., made more narrow) by modulating activation of quantum dots in a given area of the display. The quantum dots may also be used to compensate for incorrect concentrations of LEDs of particular emission color bands in a display system. This can be used to produce a cost-effective lighting solution that corrects or compensates for color shifts in RGB LEDs that by themselves may vary with temperature and driver electric current.

In some possible embodiments, mechanisms as described herein form a part of a display system, including but not limited to a handheld device, game machine, television, laptop computer, netbook computer, cellular radiotelephone, electronic book reader, point of sale terminal, desktop computer, computer workstation, computer kiosk, and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Modulated Light Sources

FIG. 1A illustrates example modulation light source 100 in accordance with some possible embodiments of the present invention. The modulation light source 100 comprises a light converter 102 and one or more first light sources 104. As used herein, a light converter as described herein may be of any physical shape such as a shape with planar surfaces or curved surface, a cubic shape, a cylindrical shape, a shape with regular or irregular contours, etc. For the purpose of illustration only, the light converter 102 may be a (light) modulation layer and may have one or more planar or curved surfaces through which regenerated light from the light converter 102 is to be projected out.

The one or more first light sources 104 may or may not be modulated, and may emit first light 106, at least some of which has wavelengths no more than one of one or more threshold wavelengths. The one or more threshold wavelengths may be intrinsic properties of, and thus determined by, light conversion materials in the light converter 102. The light conversion materials (e.g., quantum dots) in the light converter 102, when illuminated by the first light 106 with wavelengths no more than one of the one or more threshold wavelengths, is configured to regenerate second light 108 with different wavelengths than the wavelengths of the incident first light. Like the threshold wavelengths for light regeneration, the wavelengths in the second light 108 may be intrinsic properties of, and thus determined by, physical attributes of the light conversion materials such as the quantum dots. In some possible embodiments, the physical attributes, including types, sizes, shapes, etc., of the quantum dots may be particularly chosen such that, when illuminated by first light 106 from the first light sources 104, the light converter 102 regenerates the second light 108 comprises wavelengths within one or more prescribed ranges of wavelengths. In a particular possible embodiments, the second light 108 comprises only wavelengths within one or more prescribed ranges of wavelengths In some possible embodiments, the first light 106 comprises color components, at least one of which possesses light wavelengths that are distributed across a broad range of wavelengths. For example, the first light sources may comprise (broadband) light-emitting diodes (LEDs). The LEDs may generate one or more color components (e.g., RGB). Each color component from the LEDs may possess light wavelengths distributed across a broad range of light wavelengths.

The second light 108, on the other hand, may comprise color components with wavelengths in their respective prescribed ranges of wavelengths. For example, each color component (e.g., red color component) in second light 108 may possess wavelengths within a corresponding one of the prescribed ranges of wavelengths. In a particular possible embodiment, each color component (e.g., red color component) in second light 108 may possess only wavelengths within a corresponding one of the prescribed ranges of wavelengths (e.g., a narrow range of red light wavelengths, among the prescribed ranges of wavelengths, to which the red color component corresponds). In some possible embodiments, the number of color components in second light 108 may be preconfigured to a set number before the modulated light source 100 is used, for example, in a display system. The color components in second light 108 may form a set of primary colors that can be used to produce a particular white point (e.g., D65 as defined by the International Commission on Illumination (CIE)) in a color gamut supported by the display system.

As used herein, the term "a prescribed range of wavelengths" may refer to a narrow, contiguous range of light wavelengths. In some possible embodiments, a prescribed range of wavelengths may be a range with a maximum width of one (1) nanometer. In some possible embodiments, a prescribed range of wavelengths may be a range with a maximum width of five (5) nanometers. In some possible embodiments, a prescribed range of wavelengths may be a range with a width that is smaller than one (1) nanometer. In some possible embodiments, a prescribed range of wavelengths may be a range with a width that is smaller than five (5) nanometers. In some possible embodiments, a prescribed range of wavelengths may be specified as ratios between a first width of a first range of wavelengths as produced by first light 106 and a second width of a second range of wavelengths as produced by second light 108. For example, the first light source 104 may produce the first light 106 that has a blue LED color component, across a first range of wavelengths having a first width of 20 nanometers. The light converter 102, on the other hand, may be configured to convert the first light 106 into the second light 108 such that a blue color component in the regenerated second light 108 has a prescribed range of wavelengths with a second width that is a percentile of the first width of the first range of wavelengths. This percentile may be 2, 5, 10, 20, 50, or other smaller or larger percentile. Analogously, the same blue LED color component in first light 106 may cause the light converter 102 to regenerate a red color component in the second light 108, the red color component having a prescribed range of wavelengths with a width that is another percentile of the first width of the first range of wavelengths. This percentile may be 2, 5, 10, 20, 50, or other smaller or larger percentile.

3. Light Sensors and Regulators

Figure 1B:
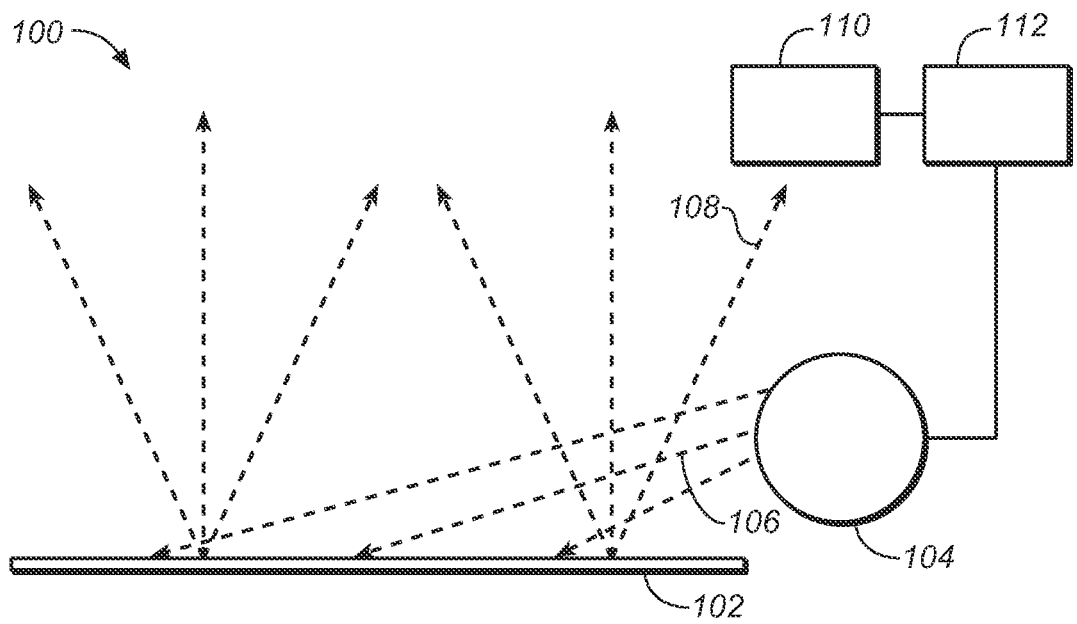

FIG. 1B illustrates an alternative configuration of an example modulated light source 100 in accordance with some possible embodiments of the present invention. In some possible embodiments, the modulated light source 100 may additionally and/or optionally comprise one or more light sensors 110. The light sensors 110 may be configured to take measurements of wavelengths and strengths of color components in first light 106 and/or second light 108. In some possible embodiments, the light source 100 may additionally and/or optionally comprise one or more light regulators 112. The light regulators 112 may be operatively linked with the light sensors 110 to receive measurements there from. In some possible embodiments, the modulated light source 100 may comprise data processing logic to determine trends in the raw measurement data. The modulated light source 100 may perform database operations such as storing and retrieving the measurement data before or after processing. The light regulators 112 may be configured to adjust, based on the measurements, the relative and/or absolute strengths of color components in second light 108. It should be noted that, in some possible embodiments, some or all of the foregoing may not be implemented in a modulated light source, but rather may be implemented as a part of a larger system that includes the modulated light source 100.

In some possible embodiments, a modulated light source as described herein further comprises an age compensation unit. The age compensation unit may implement one or more age tracking algorithms to determine an aging state of (i) a modulation layer or (ii) a portion therein. In some possible embodiments, the modulated light source may use the light sensors 110 to determine whether the photon output (or the intensity of regenerated light) from the modulation layer or light conversion unit under incident light of a calibrated intensity has decreased from a first time (e.g., when the modulated light source begins its operating life) to a second time (e.g., one year after the first time). When the decrease in photon output is worse than a particular threshold, e.g., the photon output at the second time is 80%, 90%, 95%, etc., of the photon output at the first time, the modulated light source may activate a compensation mechanism to increase the photon output of the modulation layer or the portion therein. For example, the modulated light source 100 may increase the drive electric current or power to the first light sources to boost the photon output. The increase of the drive electric current or power to the first light sources may be calibrated based on the detected decrease of the photon output as measured by the light sensors.

4. Optical Stack

Figure 1C:
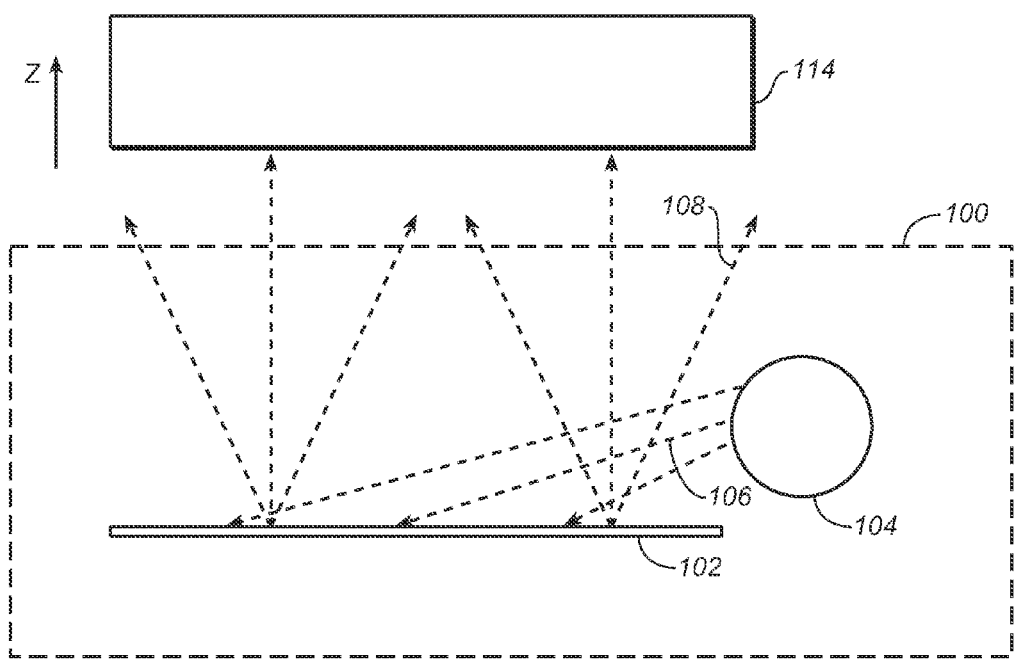

FIG. 1C illustrates an example configuration in which regenerated light from an example modulation light source 100 may be used to illuminate an example optical stack 114 in accordance with some possible embodiments of the present invention. In some possible embodiments, the optical stack 114 may be a part of a display system. As described herein, an optical stack (e.g., 114) may comprise one or more of diffusers, polarization layers, light-focusing layers (e.g., made of one or more light-redirecting optical prisms), reflective layers, substrate layers, thin films, retardation films, rubbing surfaces, light crystal layers, color and/or colorless filters, color enhancers, etc. For example, the optical stack 114 may comprise a diffuser such that second light 108, even though it may have a portion of light directed off axis relative to a z-axis (e.g., towards a viewer of the display system), may be redirected and evenly distributed by the diffuser into outgoing light that is substantially in the direction of the z-axis. In some possible embodiments, the light source 100 may comprise one or more optical components that are configured to diffuse and redirect light. In some possible embodiments, the optical stack 114 or the light source 100 may comprise one or more optical components such as reflective layers, polarization layers, optical filters, etc., to prevent first light 106 from illuminating pixels in the display system and to allow second light 106 to illuminate the pixels. It should be noted that, in some possible embodiments, some or all of the foregoing components in an optical stack may be implemented as a part of a modulated light source (e.g., 100), or instead as a part of a larger system that include the modulated light source 100.

5. Patterned Modulation

Figure 2A:
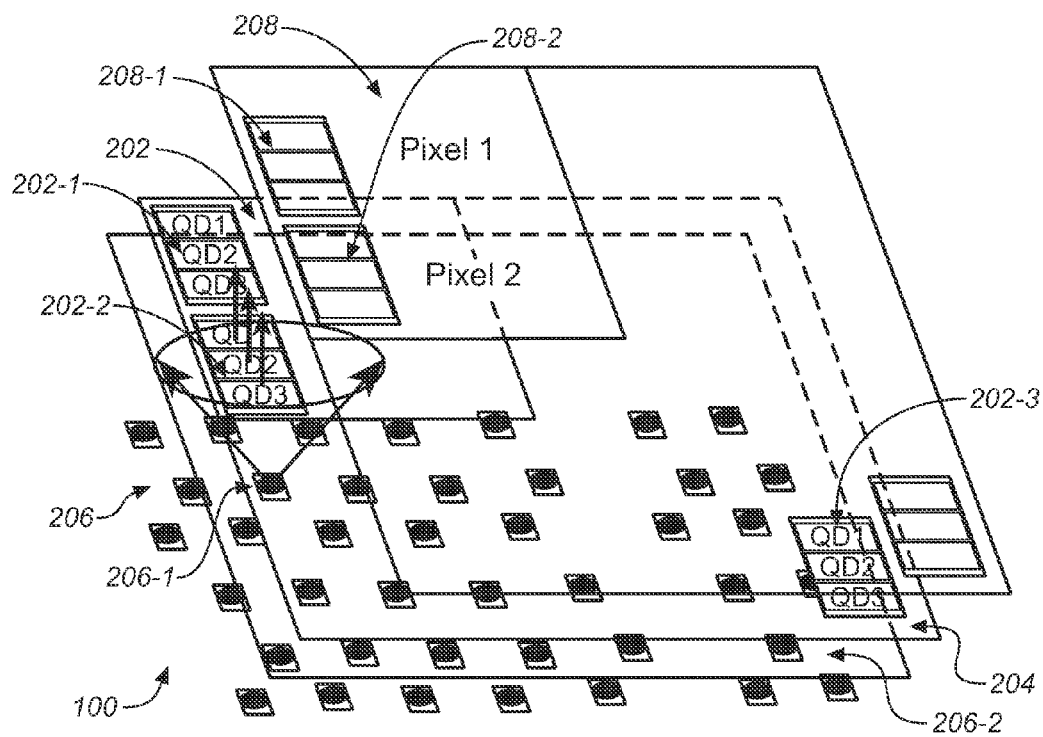
FIG. 2A and FIG. 2B illustrate example display systems that comprise modulated light sources, according to possible embodiments of the present invention.

FIG. 2A illustrates an example display system in which an example modulated light source (e.g., 100) with a light converter in the form of a fully patterned modulation layer 202 is used to illuminate pixels of the display system, in accordance with some possible embodiments of the present invention. As illustrated, the modulated light source 100 may comprise first light sources 104 in the form of a LED array 206. In various possible embodiments of the present invention, LEDs in array 206 may comprise only a single type of LEDs, only two types of LEDs, only three types of LEDs, or more types of LEDs. In some possible embodiments, all LEDs in array 206 may be required to emit light with wavelengths at least no more than the maximum of one or more threshold wavelengths as determined by light conversion materials in modulation layer 202. LEDs in array 206 may emit visible or invisible light. For the purpose of the present invention, other types of first light sources other than LEDs, including other modulated light sources whether quantum dot based or not, may be used in place of, or in addition to, the LED array 206. For example, in some possible embodiments, part of regenerated light from modulation layer 202 may feedback to be part of first light 106. In particular, in some possible embodiments, part of regenerated blue light may be projected into a light guide to illuminate modulation layer 202 to cause an increase of regenerated green or red light, but a decrease of blue light, from modulation layer 202.

In some possible embodiments, the modulation layer 202 may comprise quantum dots of wide sensitivity. As used herein, the term "quantum dots of wide sensitivity" means that the light intensity of the regenerated light from the quantum dots is responsive to the light intensity of the incident first light 106 that is from all types of LEDs in array 206. In some possible embodiments, quantum dots of wide sensitivity may efficiently convert most of the energy from incident first light to the energy of regenerated light without much loss (e.g., to heat or ineffective light regeneration). In an example, LED array 206 may comprise a single type of blue LEDs. In this example, quantum dots are of wide sensitivity—if the regenerated light from these quantum dots is responsive to the light intensity of the blue LEDs. In another example, LED array 206 may comprise two types of LEDs. In this example, quantum dots are of wide sensitivity—if the regenerated light from these quantum dots is responsive to the light intensities of both types of LEDs.

In some possible embodiments, the modulation layer 202 may comprise quantum dots of narrow sensitivity. As used herein, the term "quantum dots of narrow sensitivity" means that the light intensity of the regenerated light from the quantum dots is responsive to the light intensity of the incident first light 106 that is from a particular ones of several types of LEDs in array 206. In an example, array 206 may comprise two types (e.g., blue and red) of LEDs. In this example, quantum dots are of narrow sensitivity, if the regenerated light from these quantum dots is responsive to the light intensity of a particular one (e.g., blue but not red) of the two types of LEDs.

In some possible embodiments, the modulation layer 202 may comprise quantum dots of intermediate sensitivity. As used herein, the term "quantum dots of intermediate sensitivity" means that the light intensity of the regenerated light from the quantum dots is responsive to the light intensity of the incident first light 106 from two or more, but not all, of three or more types of LEDs in array 206. In an example, array 206 may comprise three types (e.g., ultraviolet, blue and red) of LEDs. Quantum dots are of intermediate sensitivity, if the regenerated light from these quantum dots is responsive to the light intensities of two (e.g., blue and ultraviolet) but not all three of the three types of LEDs.

In some possible embodiments, the modulation layer 202 may comprise quantum dots of narrow sensitivity. For example, in these embodiments, one type of quantum dots may be responsive to blue LEDs in array 206 but may be unresponsive to other LEDs in array 206, while another type of quantum dots may be responsive to ultraviolet LEDs in the light source 100. In some possible embodiments, the modulation layer 202 may comprise quantum dots of wide sensitivity. For example, in these embodiments, all types of quantum dots may be responsive to all LEDs in array 206. In some possible embodiments, the modulation layer 202 may comprise quantum dots of intermediate sensitivity only. For example, quantum dots may be responsive to ultraviolet and blue, but not red LEDs, in array 206. In some possible embodiments, the modulation layer 202 may comprise quantum dots of a mixture of one or more of narrow, intermediate, or wide sensitivity. For example, a first type of quantum dots may be responsive to ultraviolet incident light emitted from array 206; a second type of quantum dots may be responsive to ultraviolet and blue incident light emitted from array 206; and a third type of quantum dots may be responsive to all ultraviolet, blue and red incident light emitted from array 206.

As used herein, the phrase "quantum dots are responsive to a type of LEDs" refers to the quantum dots regenerating light in much greater intensity when the incident light is provided by that type of LEDs in array 206 than when the incident light is provided by another type of LEDs in array 206 to which the quantum dots are not responsive. For example, quantum dots of blue color component may regenerate blue light in much greater intensity when incident light is provided by a first type of LEDs than a second type of LEDs. For example, the first type of LEDs may be blue LEDs in array 206 that emit light within a particular range of wavelengths, while the second type of LEDs may be a different color light LEDs in array 206 that emit light with a different range of wavelengths. The difference in intensities of the regenerated light when incident light is respectively provided by these two different types of LEDs may be greater than a ratio of 10:1, 20:1, 50:1, 100:1, or a different ratio than the foregoing, in various possible embodiments of the present invention. In various possible embodiments, a different ratio may be configured to determine whether the quantum dots may be deemed responsive to the first type of LEDs in array 206.

In some possible embodiments, a modulation layer (e.g., 202) as described herein may comprise a plurality of light conversion units arranged in a particular pattern. For example, the modulation layer 202 may, but is not limited to, comprise a grid pattern which may include one or more light conversion units such as a first light conversion unit 202-1, a second light conversion unit 202-2, and a third light conversion unit 202-3, as illustrated in FIG. 2A. In some possible embodiments, a light conversion unit in a patterned modulation layer may comprise separate areas on the layer, each emitting a different color component. For example, a light conversion unit may comprise two or more different types of quantum dots (e.g., type "QD 1", type "QD 2", and type "QD 3"), each type occupying one or more different area and emitting a different color component.

As described herein, finer and coarser patterns may also be used to divide a modulation layer 202 into light conversion units. For example, in some possible embodiments in which light conversion units may be organized different than illustrated in FIG. 2A, quantum dots in both light conversion units 202-1 and 202-2 in the illustrated embodiments may instead be grouped into a single light conversion unit. Likewise, in some other possible embodiments, quantum dots of each type in the light conversion unit 202-2 in the illustrated embodiments may instead form three individual light conversion units in their own right.

It should be noted that, for the purpose of the present invention, more or fewer types of quantum dots may be used. For example, a light conversion unit 202-1 may comprise one, two, three, four, five, or six different types of quantum dots that emit their respective color components. Additionally and/or alternatively, in some possible embodiments, more than six types of quantum dots may be used. As a result, a modulated light source as described herein may be used to support relatively wide color gamuts for certain high-end display systems.

In some possible embodiments, one or more LEDs or one or more LED bins may be assigned to illuminate a light conversion unit. For example, a LED 206-1 may be assigned to illuminate one (e.g., 202-2) of the three light conversion units illustrated in FIG. 2A, while a LED 206-2 may be assigned to illuminate another (e.g., 202-3) of the three light conversion units.

In some possible embodiments, the light intensity for each LED in array 206 may be controlled individually or together with light intensities for one or more other LEDs in the array. For example, LED 206-1 may be set as in one of one or more "on" states (e.g., fully on, partially on at one of 2, 4, 8, 16, 32, 64, 128, 256 or more levels, etc.), while LED 206-2 may be set in an "off" state.

In some possible embodiments, the LEDs in array 206 may be organized into LED bins; the light intensity for LEDs in each of the LED bins may be controlled individually or together with light intensities for one or more other LED bins in the array. LED bins may be organized by a shared property of LEDs in the respective LED bins. In an example, LEDs emitting a particular color may be organized in a LED bin. In another example, LEDs illuminating a particular geographic portion of a surface formed by the modulation layer 202 may be organized in a LED bin. In another example, LEDs emitting a particular color and in a particular geographic portion of a surface formed by array 206 may be organized in a LED bin. Thus, for the purpose of the present invention, attributes of LEDs, such as their locations, colors, etc., may be used to organize the LEDs into a plurality of LED bins whose intensity states may be individually or collectively controlled.

In some possible embodiments, different LED bins occupy non-overlapping areas of a surface formed by array 206. For example, all three types of quantum dots in a light conversion unit 202-2 may be illuminated by the same LED or LED bin (e.g., 206-1).

In some possible embodiments, two or more of the LED bins may overlap in a common area of the surface as formed by array 206. For example, three LED bins may be used to illuminate quantum dots in a light conversion unit 202-2. Furthermore, alternatively and/or additionally, each of the three LED bins may emit first light 106 to which some, or all, of the quantum dots may respond.

6. Unpatterned Modulation

Figure 2B:
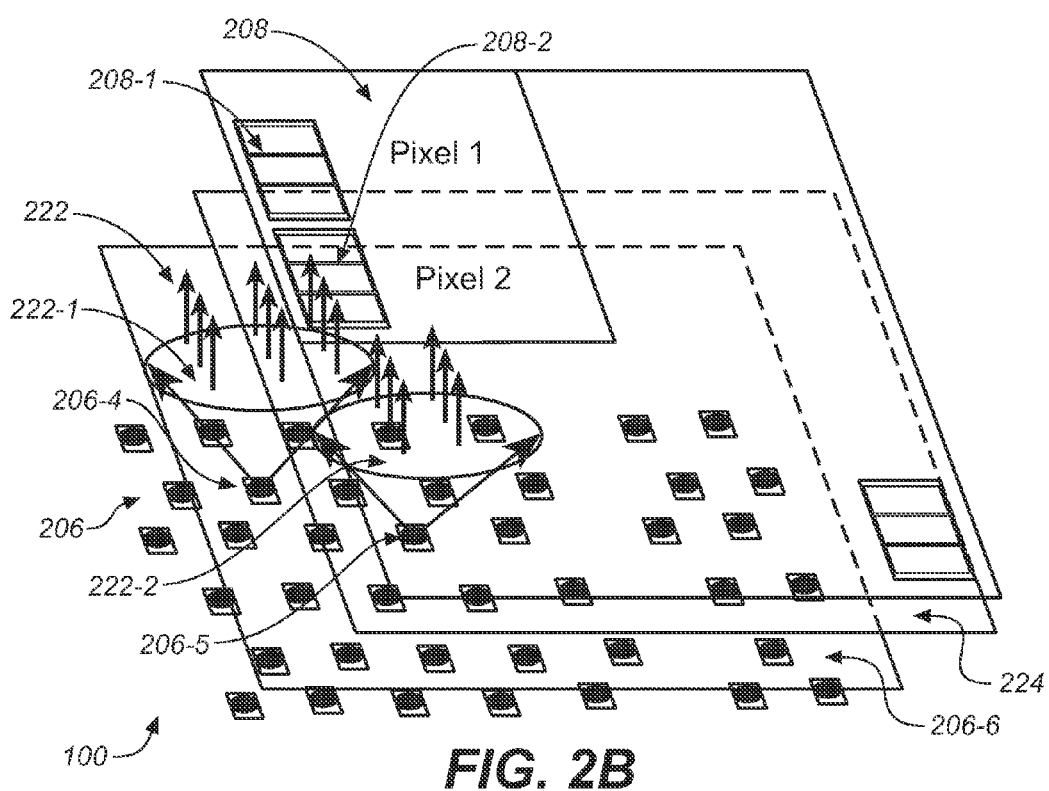

FIG. 2B illustrates an example display system in which an example modulated light source (e.g., 100) with a light converter in the form of an unpatterned modulation layer 222 is used to illuminate pixels of the display system, in accordance with some possible embodiments of the present invention. As illustrated, the modulated light source 100 may comprise first light sources 104 in the form of LED array 206.

In some possible embodiments, the modulation layer 222 may comprise a mixture of quantum dots of different color components. As used herein, the term "a mixture of quantum dots" means that two, or more types of quantum dots as described herein may be mixed according to a set ratio, for example, calibrated to provide a particular white point for a specific color gamut. In some possible embodiments, quantum dots of different color components (e.g., red, green, and blue; or QD 1, QD 2, and QD 3) may be evenly mixed. In some possible embodiments, the light intensity of the regenerated light from the quantum dots is responsive to (e.g., positively dependent on) the light intensity of the incident first light 106 that is from all types of LEDs in array 206. In some possible embodiments, proportional amounts of photons in different color components may be emitted from a mixture of quantum dots of different color components. In some possible embodiments, disproportional amounts of photons in different color components may be emitted from a mixture of quantum dots of different color components. In a possible embodiment, LED array 206 may comprise a single type of blue LEDs. In another possible embodiment, LED array 206 may comprise two or more types of LEDs such as three types (e.g., RGB) of LEDs. Selection of blue LEDs or RGB LEDs may be based on several factors including costs and color shift properties of the LEDs when driving electric currents and/or the operating temperature vary. Quantum dots in the unpatterned modulation layer 222 may be of narrow, intermediate, wide sensitivity, or a mixture of two or more of the foregoing, if two or more types of LEDs are used in array 206.

In some possible embodiments, an unpatterned modulation layer (e.g., 222) as described herein may comprise a plurality of light conversion units. For example, the unpatterned modulation layer 222 may, but is not limited to, comprise a grid pattern formed by a plurality of light conversion units such as a light conversion unit 1 222-1 and a light conversion unit 2 222-2, as illustrated in FIG. 2A. In some possible embodiments, a light conversion unit in the unpatterned modulation layer 222 may emit two or more different color components from a same area on a surface formed by the unpatterned modulation layer 222. For example, a light conversion unit may comprise a mixture of two or more different types of quantum dots (e.g., type "QD 1", type "QD 2", and type "QD 3"), each type occupying a same area and emitting a different color component.

7. Light Modulation Tiles

A display system as described herein may use a modulation layer that is replaceable after the display system is placed in use, for example, by an end customer, in some possible embodiments. For example, if the maximum intensity, and/or light regeneration efficiency, of regenerated light from a modulation layer 202 or 222 is detected to be out of a particular range, or below a particular threshold after an end customer has installed the display system at home, the entire modulation layer 202 or 222 may still be replaced without replacing other components in the display system.

In some possible embodiments, a display system as described herein may comprise light modulation tiles. In some possible embodiments, each of the light modulation tiles may be individually replaced. In some possible embodiments, a drive electric current to each of the light modulation tiles may be individually set. In some possible embodiments, each of the light modulation tiles may be individually set to one of "fully on", "dimmed", and "off" states.

Figure 3:
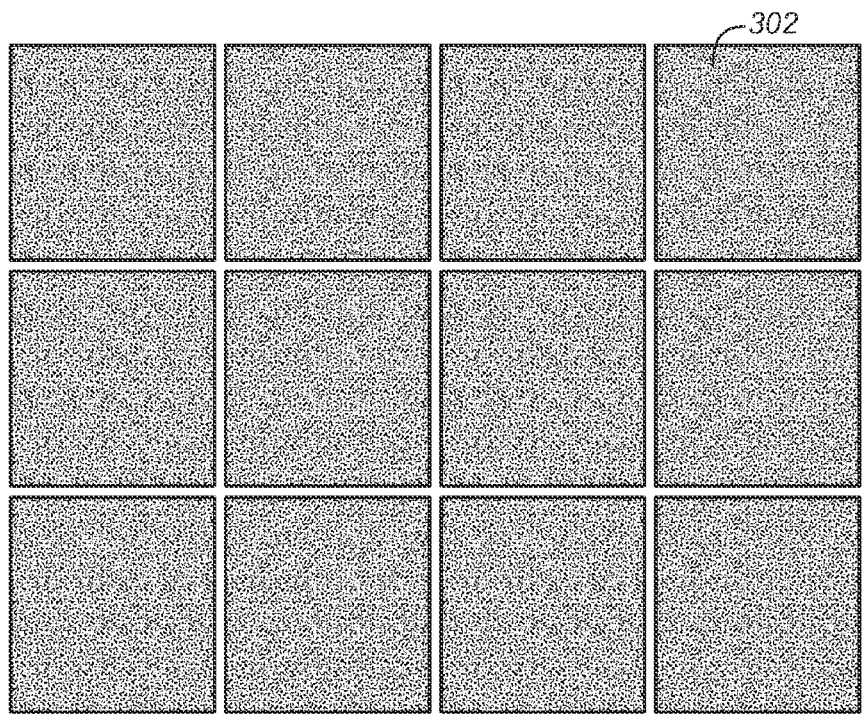
FIG. 3 illustrates an example light modulation tile array, according to possible embodiments of the present invention.

FIG. 3 illustrates an example display system in which an example modulated light source (e.g., 100) comprises a modulation layer, which may be one of 202 and 222 illustrated in FIG. 2A and FIG. 2B, in the form of a light modulation tile array 300, in accordance with possible embodiments of the invention. In some possible embodiments, the light modulation tile array 300 comprises a plurality of discrete light modulation tiles, each of which may be a light modulation tile (e.g., 302). In some possible embodiments, the maximum intensity, and/or light regeneration efficiency, of regenerated light from each light modulation tile in the array 300 may be individually measured. Based on the results of the measurements, a light modulation tile such as 302 of FIG. 3 in the array 300 may be replaced. Additionally and/or alternatively, in some possible embodiments, drive electric current may be adjusted up or down to drive the light modulation tile 302 to regenerate light at a configured level of intensity. In some possible embodiments, one or more light modulation tiles (e.g., 302) may be individually replaced in a display system as described herein without replacing other light modulation tiles in the display system.

Figure 4A:
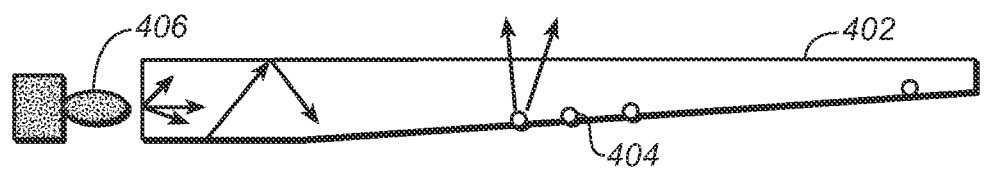
FIG. 4A, FIG. 4B, FIG. 4C, and FIG. 4D illustrate example light modulation tiles, according to possible embodiments of the present invention.

FIG. 4A illustrates an example light modulation tile, in accordance with possible embodiments of the invention. It should be noted that, while a figure herein may illustrate a single light modulation tile, a modulation layer as described herein may comprise a single light modulation tile in some possible embodiments, or a plurality of light modulation tiles in some other possible embodiments.

In some possible embodiments, a light modulation tile (e.g., 302) may comprise a light guide 402 with substructures 404 that scatter incident light from a light source (406) into a multitude of directions, in accordance with possible embodiments of the invention. In some possible embodiments, the light source 406 is the whole, or a part, of the first light 104 as previously described. In some possible embodiments, the light source 406 for the light modulation tile 302 may comprise one or more LEDs or one or more LED bins, as previously described.

In some possible embodiments, the light source 406 may be placed below the light guide 402, relative to the vertical directions of FIG. 4A through FIG. 4B. In some possible embodiments, as illustrated, the light source 406 may be placed to the side of the light guide, relative to the horizontal directions of FIG. 4A through FIG. 4B.

In some possible embodiments, substructures 404 may be cavities in the light guide 402. In some possible embodiments, substructures 404 may be particles that have one or more different refractive indices from a refractive index of much of the substance used to make the light guide 402. In some possible embodiments, substructures 404 may be bumpy structures created in the light guide 402 during manufacturing.

In some possible embodiments, light from the light source 406 may be guided into the light guide 402 from a side direction as illustrated. In some other possible embodiments, light from the light source 406 may be guided into the light guide 402 from one or more other directions that are different from what is illustrated in FIG. 4A through FIG. 4B. In some possible embodiments, the incident angles from the light source 406 may be such that at least in parts of the light paths, for example, initial parts of the light paths, total reflection of the incident light may be accomplished inside the light guide 402, until the incident light hits upon one of the substructures 404 or hits a quantum dot. In some embodiments, the light guide 402 may be configured to alter directions of incident light from the light source 406 to incident into one or more areas or surfaces where quantum dots are located.

Figure 4B:
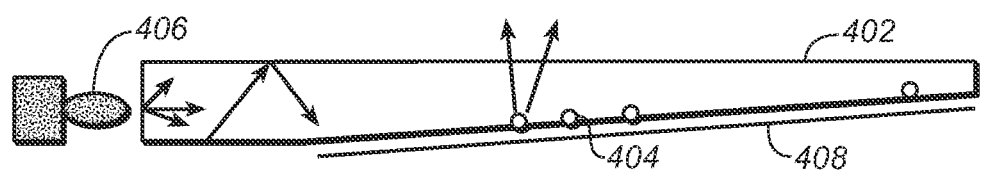
Figure 4C:
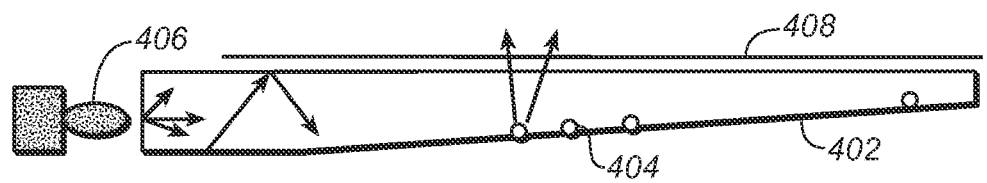
Figure 4D:
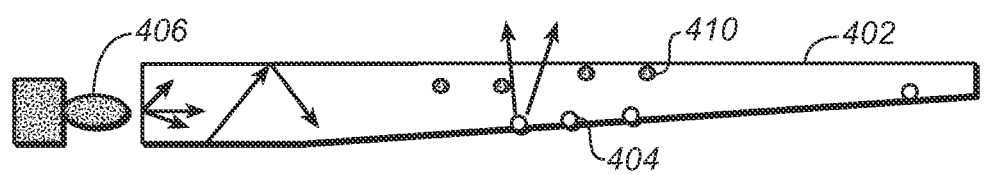

FIG. 4B illustrates an example light modulation tile with a quantum dot sheet 408 disposed on the lower surface of a light guide (e.g., 402), relative to the vertical direction (e.g., a frontal viewing angle towards a viewer of a display panel) of FIG. 4B, in accordance with possible embodiments of the present invention. FIG. 4C illustrates an example light modulation tile with a quantum dot sheet 408 disposed on the upper surface of a light guide (e.g., 402), relative to the vertical direction (e.g., a frontal viewing angle towards a viewer of a display panel) of FIG. 4C, in accordance with possible embodiments of the present invention. In some possible embodiments, the quantum dot sheet 408 may be formed by depositing (including but not limited to adhering, printing, sputtering, etc.) quantum dots onto the surface of the light guide 402. In some possible embodiments, the quantum dot sheet may be first formed and then laminated onto the lower or upper surface of the light guide 402 as illustrated in FIG. 4B and FIG. 4C. FIG. 4D illustrates an example light modulation tile with quantum dots 410 may be dispersed within a light guide (e.g., 402), in accordance with possible embodiments of the present invention.

In some possible embodiments, the substructures 404 may be evenly distributed in the light guide 402. In some other possible embodiments, the substructures 404 may be distributed unevenly in the light guide 402. In an example, the substructures 404 may be concentrated near where the quantum dot sheet 408 is located. In another example, alternatively and/or additionally, the substructures 404 may be concentrated away from where the quantum dot sheet 408 is located.

In some possible embodiments, the modulated light source, or any light modulation tile therein, may comprise additional optical components. For example, a light modulation tile (e.g., 302) may additionally and/or optionally comprise polarization films, retardation films, light recycling films, prisms, mirrors, bumpy surfaces, impurities, dopants, materials of differing refractive indices, light valves, etc., for the purpose of retaining the first light from the light source 406 within the light guide 402, or from escaping out of the light guide 402 towards restricted directions, in the light modulation tile 302 until hitting the quantum dots and being converted to regenerated light by the quantum dots, while causing regenerated light to be emitted out of the light modulation tile 302 to illuminate a display panel.

8. Intensity States

Finer and coarser patterns may also be used to divide a modulation layer into light conversion units. It should be noted that for the purpose of the present invention, more or fewer types of quantum dots may be used. For example, a light conversion unit 202-1 may comprise one, two, three, four, five, or six different types of quantum dots that emit their respective color components. Additionally and/or alternatively, in some possible embodiments, more than six types of quantum dots may be used. As a result, a modulated light source with an unpatterned modulation layer as described herein may be used to support a relatively wide color gamut.

In some possible embodiments, one or more LEDs or one or more LED bins may be assigned to illuminate a light conversion unit, which may be a whole, or a part, of a light modulation tile (e.g., 302). For example, LED 206-4, LED 206-5, and LED 206-6 may be assigned to illuminate light conversion unit 1 222-1, light conversion unit 2 222-2, and another light conversion unit (not shown), respectively.

In some possible embodiments, intensity states of LEDs or LED bins that illuminate a set of pixels may be dynamically set. In some possible embodiments, the intensity states may be set based on average luminance levels required for the pixels in one or more images that are to be displayed. The average luminance levels may be computed based on image data for the images. In these images, some areas (e.g., on an image portraying the interior of a church including brightly illuminated windows) of the display panel may appear bright, while other areas (e.g., interior sections of the church with fine architectural details) of the display panel may appear dimmed Settings of different "on" states of LEDs to states (e.g., dimmed) other than fully "on" and "off" based on the image data produces a display system that has a relatively high dynamic range for contrast levels and thus is able to display relatively detailed images. For example, the intensity states of LEDs 206-1 through 206-6 as illustrated in FIG. 2A and FIG. 2B may be fully on, partially on, and off, respectively.

While the display system is configured to support a large variation of brightness levels (e.g., local dimming in an area of pixels illuminated by light conversion unit 2 222-2) for different areas of images, the display system is also configured to support a fine control of brightness levels within each of the areas, in order to show high-quality images that comprise many fine details. In some possible embodiments, the brightness levels within each of these areas, as perceived by a viewer, may be further controlled on the basis of individual pixels or pixel blocks based on the image data using light valves and color filters in these pixels. For example, a pixel may comprise subpixels of different colors whose brightness levels may be individually controlled on a subpixel basis to produce a precise point in a color gamut, as appropriate for the image data.

As discussed earlier, the light intensity of the color component generated by the quantum dots may be selectively responsive to the light intensities of one, two, or a limited number, but not all, of types of LEDs. The selective responses of quantum dots to different LEDs allow a particular color component to be enhanced while another color component is attenuated as required by the image data. Thus, a display system may produce colors that are relatively free of halos and/or light pollution from nearby colors or nearby pixels or sub-pixels. For example, if a particular region of pixels should display a red color, one or more selective LED bins that cause red color component in the regenerated light may be turned on, while other LED bins that cause other color components in the regenerated light may be turned off or set to dimmed states. Thus, a display system with a modulated light source as described herein may have a relatively wide color gamut (capable of expressing deeply saturated colors), and thus is able to display relatively accurate colored images.

In some possible embodiments, a display system as described herein further comprises a display panel 208 comprising a plurality of pixels which may, but are not limited to, include pixels 208-1 and 208-2, as illustrated in FIG. 2A and FIG. 2B. As illustrated, each pixel may be illuminated with second light with color components in the prescribed range of wavelengths, as regenerated by one or more light conversion units in the modulation layer (e.g., 202 and 222).

In some possible embodiments, a display system as described herein may comprise an optical stack (e.g., 204 of FIGS. 2A and 206 of FIG. 2B). The optical stack or some or all components therein may be placed before or after the modulation layer.

In some possible embodiments, a display system with modulated light sources as described herein is configured to implement one or more of a plurality of wide color gamuts, which may be standard-based. In some possible embodiments, the display system may be configured with three types of quantum dots in the modulation layer (e.g., 202 and 222) to implement a particular wide color gamut such as Academy Color Encoding Space (ACES) P3, or Digital Cinema Initiative color space, or a wider color gamut. In some possible embodiments, the display system may be configured with more than three types of quantum dots (e.g., 4, 5, 6, or more types of quantum dots) in the modulation layer (e.g., 202 and 222) to implement a specific color gamut that is even wider than the foregoing color gamuts. For example, the display system may implement a particular wide color gamut such as ACES P4, P5, P6 or larger.

Color gamuts as described herein may substantially conform to a RGB color space that is associated with the International Telecommunication Union Radio Communication Sector (ITU-R) BT.709 Recommendation standard of the International Telecommunications Union (ITU). The color spaces may substantially conform to at least one of the RGB color spaces that are associated with the ACES standard of the Academy of Motion Picture Arts and Sciences (AMPAS), the color space standard of the Digital Cinema Initiative (DCI), or the Reference Input Medium Metric/Reference Output Medium Metric (RIMM/ROMM) standard.

Figure 7:
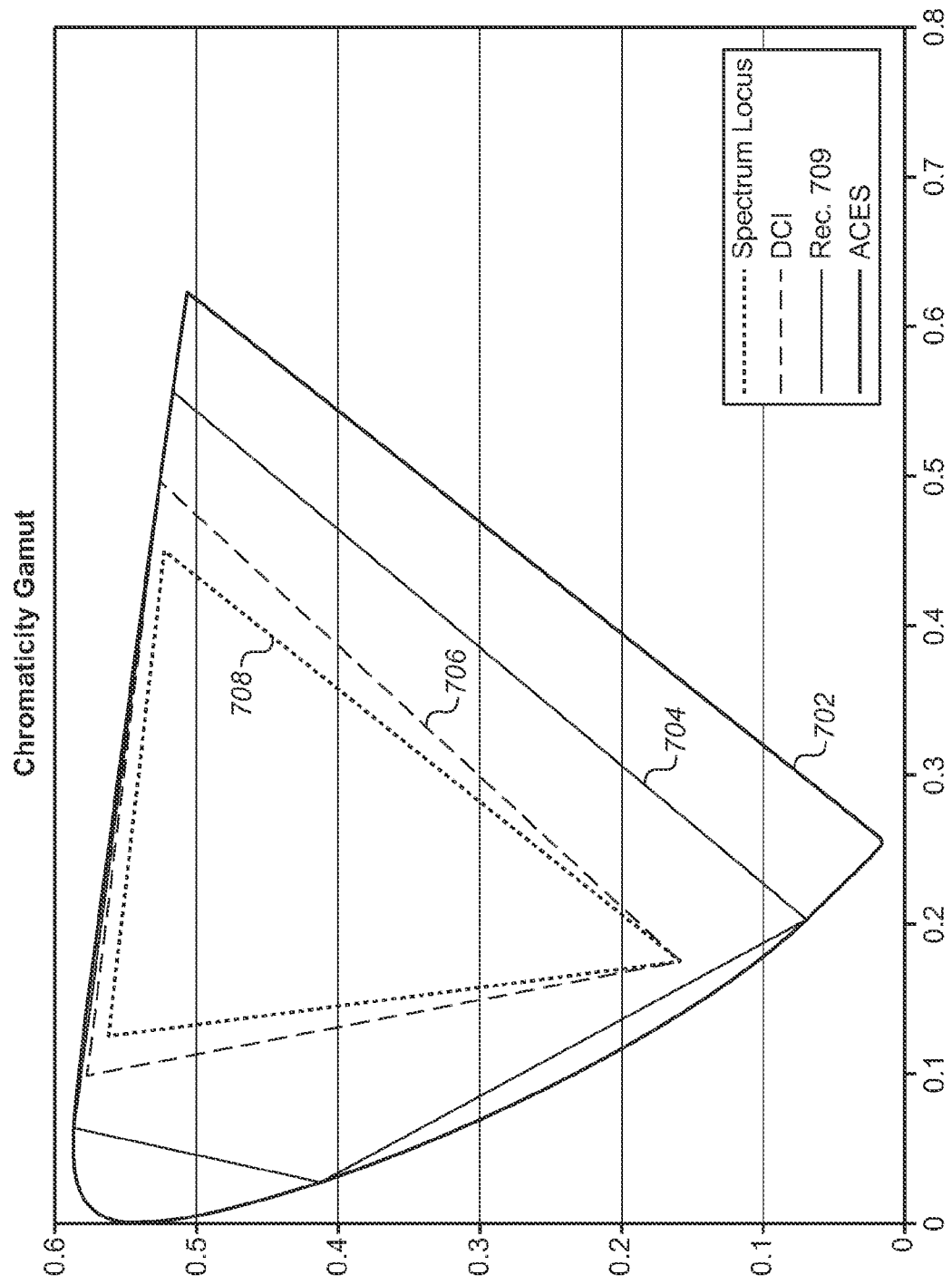
FIG. 7 depicts an example color gamut, according to an embodiment of the present invention.

FIG. 7 depicts an example color gamut, according to an embodiment of the present invention. The color gamut may comprise a spectrum locus 702. Within spectrum locus 702 are gamut 704, which relates to one of the ACES color spaces, gamut 706, which relates to the DCI color space, and gamut 708, which relates to the BT-709 color space. It should be noted that in various possible embodiments of the present invention, other color spaces not depicted, which may include a color space relating to Reference Input/Output Medium Metric RGB Color Encodings (RIMM/ROMM RGB), may also be configured for a display system that implements light modulation techniques as described herein.

9. Modulated Light Source Controller

Figure 5:
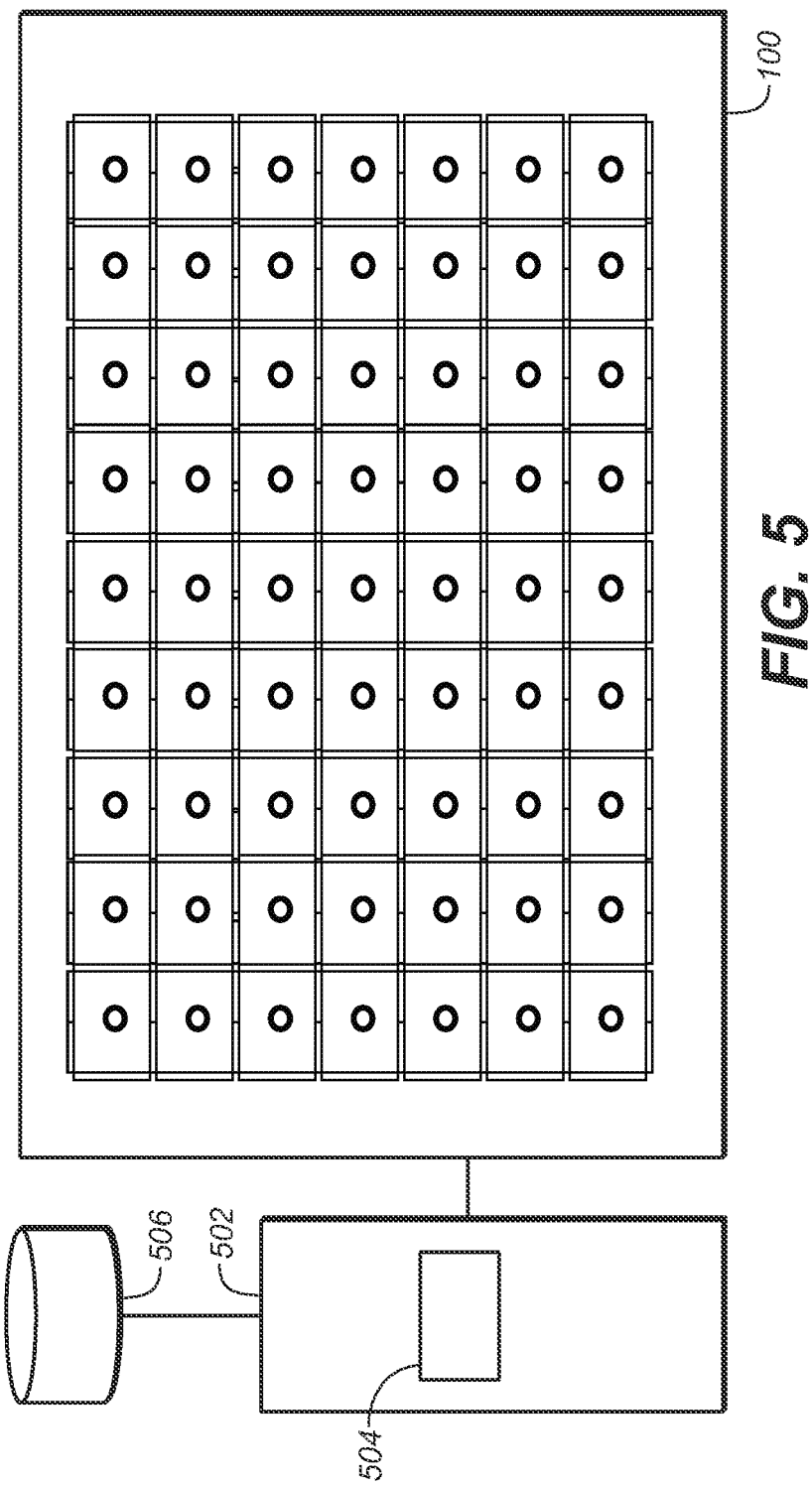
FIG. 5 illustrates a block diagram of an example modulated light source, according to possible embodiments of the present invention.

As shown in FIG. 5, a display system as described herein may comprise a modulated light source 100 and a modulated light source controller 502 configured to receive image data from an image data source 506. Each LED and/or each LED bin in the modulated light source 100 may be set with a local intensity state. The modulated light source controller 502 may be configured to set the operational states of the LEDs or LED bins to provide the desired dimming level for an area of a display panel in the display system based on the image data received from the image data source 506. The image data may be provided by the image data source 506 in a variety of ways including from over-the-air broadcast, a set-top box, a networked server coupled to the display system, and/or a storage medium. The modulated light source controller 502 may comprise sampling logic 504 to sample image data and compute, based on the image data, luminance values of a pixel, a group of pixels, or a portion of an illuminated surface such as a surface of the diffuser or the display panel. The results of sampling and computing may be used by the modulated light source controller 502 to drive the LEDs or LED bins.

In some possible embodiments, LEDs or LED bins may have a single operational state: fully on. In some possible embodiments, LEDs or LED bins may have two or more operational states: off, on (fully on or a maximum intensity level), and one or more intermediate intensity levels (dimmed states).

In some possible embodiments, based on the image data, a modulated light source controller as described herein may determine that a central designated portion on the display panel illuminated by regenerated light excited by first light from an LED or an LED bin should be illuminated at a certain level and accordingly determine that the LED or LED bin should be set in a corresponding operational state. This determination may be repeated by the modulated light source logic for all the LEDs or LED bins in the system.

The modulated light source controller 502 may implement one of several possible algorithms to determine an appropriate intensity level for an LED or LED bin. In one possible embodiment, the intensity level may be set to be proportional to the desired illumination level for the designated portion on the display panel. In another possible embodiment, the intensity level determination may take into consideration other factors such as the desired illumination level of a particular color, ageing of light conversion units involved, etc.

10. Example Process Flow

Figure 6:
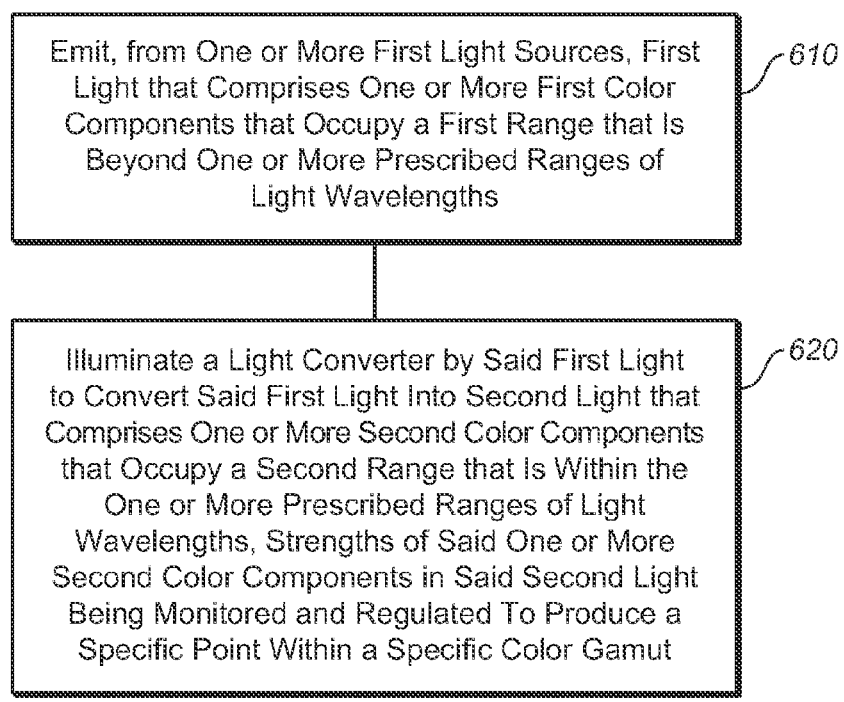
FIG. 6 illustrates an example process flow, according to a possible embodiment of the present invention.

FIG. 6 illustrates an example process flow according to a possible embodiment of the present invention. In some possible embodiments, one or more computing devices or components in a display system may perform this process flow.

In block 610, a modulated light source (e.g., 100) causes one or more first light sources 104 to emit first light (e.g., 106). The first light 106 may comprise one or more first color components that occupy beyond one or more prescribed ranges of light wavelengths.

In block 620, the modulated light source 100 causes the first light 106 to illuminate a light converter (e.g., a light modulation layer 102) so as to convert the first light into second light (or regenerated light 106). The second light comprises one or more second color components that occupy a range within the one or more prescribed ranges of light wavelengths. Strengths (or intensity levels) of the one or more second color components in the second light may be monitored and regulated to produce a particular point within a specific color gamut. As described herein, this particular point may be maintained by the modulated light source over an extended period of 100, 500, 1000, or more or fewer hours in various possible embodiments. As described herein, this particular point may also be maintained by the modulated light source over an extended range of operating temperatures (−40-100° C., −20-80° C., etc.) in various possible embodiments.

In some possible embodiments, the modulated light source may comprise one or more light sensors configured to measure the strengths of the first and/or second color components. In some possible embodiments, the modulated light source may further comprise one or more light regulators configured to adjust, based on the measurements, the strengths of the first and/or second color components.

In some possible embodiments, the first light sources are LEDs or LED bins. In some possible embodiment, the LEDs in the modulated light source comprise all single colored LEDs, for example, blue LEDs. In some possible embodiments, the LEDs in the modulated light source comprise multi-colored LEDs such as RGB LED, white LEDs, or different types of LEDs.

In some possible embodiments, the light converter comprises one or more groups of quantum dots, each group of quantum dots being configured to produce a color component within one of the prescribed ranges of light wavelengths. In some possible embodiments, the quantum dots may be deposited on a substrate within the modulated light source. In some possible embodiments, the quantum dots may be laminated onto a surface within the modulated light source. In some possible embodiments, each of the quantum dots is enclosed in one or more protective materials within the modulated light sources.

In some possible embodiments, the modulated light source is configured to confine the first light within the modulated light source and to emit the second light (or regenerated light).

In some possible embodiments, the light emitted out of the modulated light source may be configured to shine through a diffuser. In some possible embodiments, the light emitted out of the modulated light source may be configured to shine onto a display panel.

In some possible embodiments, the light converter (or light modulation layer) in the modulated light source may comprise an array of light conversion units. Each light conversion unit may be configured to produce a part of a single color component in the second color components in the second light. In some possible embodiments, each light conversion unit may be configured to produce a part of all color components in the second color components in the second light. In some possible embodiments, each light conversion unit is configured to produce a part of some but not all color components in the second color components in the second light. In some possible embodiments, intensities of one or more parts of one or more color components, regenerated by each light conversion unit, in the second light is monitored and regulated to produce the particular point within the specific color gamut.

In some possible embodiments, the modulated light source may be configured to operate within a range of temperatures; strengths of the one or more second color components in the second light are monitored and regulated to produce the same particular point within the same specific color gamut for any temperature in the range of temperatures.

In some possible embodiments, a light source system may comprise a modulated light source as described in the foregoing and a modulated light source logic comprising a plurality of data inputs and data controls coupled to the light source. The modulated light source logic may be configured to monitor and regulate strengths of one or more color components in light emitted out of the light source to produce a particular point within a specific color gamut.

11. Equivalents, Extensions, Alternatives and Miscellaneous

In the foregoing particularation, possible embodiments of the invention have been described with reference to numerous particular details that may vary from implementation to implementation. Thus, the sole and exclusive indicator of what is the invention, and is intended by the applicants to be the invention, is the set of claims that issue from this application, in the particular form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The particularation and drawings are, accordingly, to be regarded in an illustrative rather than a restrictive sense.

In some possible embodiments, quantum dots that regenerate light at particular colors may replace color filters. Thus, in these embodiments, light valves such as one or more LCD panels comprising pixels or sub-pixels may be further away from a viewer than, and behind, the quantum dots. For example, a sub-pixel that is to transmit green light may be coated with quantum dots that emit regenerated green light; a sub-pixel that is to transmit blue light may be coated with quantum dots that emit regenerated blue light; a sub-pixel that is to transmit red light may be coated with quantum dots that emit regenerated red light. Other color systems other than RGB may also be used. For instance, 3, 4, or five different color lights may be used in a display system as described herein. In some embodiments, instead of using color filters to produce colors, quantum dots that regenerate these different colors may be coated on pixels or light valves, whether these pixels or light valves are LCD-based or not.

In some possible embodiments, a modulated light source (e.g., that uses quantum dots to regenerate lights at very precise wavelengths in prescribed ranges) as described herein may be used in various types of configurations including those with zero, one, two, or more display panels. A display panel as described herein may or may not be LCD-based. In some embodiments, a modulated light source herein may be used in a system with two display panels. In an example, one display panel in such a system may be a black-and-white display panel while another display panel in the same system may be a color display panel. Additionally and/or optionally, one display panel in a system may be a high transmission display panel while another display panel in the same system may be a lower transmission display panel. Furthermore, a modulated light source herein may support two or more display panels in any order. For example, a black-and-white display panel may be before or after a color display panel. Additionally and/or optionally, a high transmission display panel may be before or after a low transmission display panel. A modulated light herein may be used in a system that uses various types of display panels. In an example, a display panel may be based on electrowetting, plasma, front projection, liquid crystal, etc. Liquid crystal display panels may comprise light valves that use various types of liquid crystal materials, organic (e.g., cholesterol), inorganic, lyotropic liquid crystals, electrically controlled birefringence (ECB) liquid crystals, etc.

In some possible embodiments, a modulated light source (e.g., that uses quantum dots to regenerate lights at very precise wavelengths in prescribed ranges) as described herein may be used in various types of optical configurations including zero, one, two, or more optical components of a kind. For example, in some embodiments, a modulated light source herein may be used in a system with zero, one, two, or more polarizers.

In some possible embodiments, a modulated light source herein may comprise different types of LEDs and different types of quantum dots. For example, in some possible embodiments, two types of LEDs may be used. Blue LEDs or first frequency LEDs may be used to regenerate blue quantum dot frequency light and red quantum dot frequency light. Optionally and/or alternatively, a part of the blue LED light may be directly passed through to illuminate a target such as a diffuser or a display panel, while the remaining part of the blue LED light may be used to regenerate the red quantum dot frequency light. Additionally and/or optionally, green LEDs or second frequency LEDs may be used to regenerate green quantum dot frequency light. Optionally and/or alternatively, the green LED light may be directly passed through to illuminate a target such as a diffuser or a display panel. In some possible embodiments, techniques as described herein may modulate and/or control blue and red light as a first set of light, and modulate and/or control green light separately as a second set of light, thereby eliminating possible overlap between these two sets of light that would exists should light of blue, green, and red be modulated and controlled together.

In some possible embodiments, a light converter or regenerator as described herein may be configured to control its input sensitivity to produce a P5 or P6 color gamut. Alternatively and/or optionally, quantum dots may be added on top of one or more LEDS (e.g., each blue LED) such that each LED set can have different compositions of color components according to the local region of color as determined from image data of one or more images to be rendered. Thus, techniques as described herein allow controlling the white point and primary color components in local regions with a light converter and regenerator as described herein that comprises quantum dots.

It should be noted that a modulated light source as described herein may be configured to generate different color components for a different image or image frame. For example, in some possible embodiments in which images are presented in a sequential manner, the modulated light source may generate different color components for different images of a sequence. In some possible embodiments, a single image frame may be sequentially illuminated by a modulated light source as described herein in two or more time intervals during each of which different color components may be used to illuminate a display panel when pixels of the display panel are loaded with image data of the same image frame. For example, in a first time interval, an image frame may be presented with red and blue color components while in a second time interval, the image frame may be presented with a green color component. In a particular embodiment, the frame rate may be reduced proportionally. For example, a half frame rate may be used. Each of the frame at the half frame rate may comprise two illumination intervals during each of which a different set of color components from a light source as described herein is used.

What is claimed is:
1. A light source, comprising:
one or more first light sources that are configured to emit first light comprising one or more first color components that occupy a first range that is beyond one or more prescribed ranges of light wavelengths; and
a light converter configured to be illuminated by the first light and to convert the first light into second light, the second light comprising one or more second color components that occupy a second range within the one or more prescribed ranges of light wavelengths, each of the one or more second color components in the second light having strengths monitored and regulated to produce a particular point within a specific color gamut,
wherein the light converter comprises one or more light modulation tiles, at least one of which is replaceable without replacing other components including other light modulation tiles in a display system.
2. The light source as recited in claim 1, further comprising:
one or more light sensors configured to measure the strengths of the one or more second color components; and one or more light regulators configured to adjust, based on the measurements, the strengths of the one or more second color components.

3. The light source as recited in claim 1, wherein the first light sources comprise light-emitting diodes.

4. The light source as recited in claim 3, wherein the light-emitting diodes comprise single colored light-emitting diodes.

5. The light source as recited in claim 3, wherein the light-emitting diodes comprise multi-colored light-emitting diodes.

6. The light source as recited in claim 1, wherein the light converter comprises one or more groups of quantum dots, each group of quantum dots being configured to produce a color component within one of the prescribed ranges of light wavelengths.

7. The light source as recited in claim 1, wherein the light source is configured to modulate or control a first set of light colors and to modulate or control one or more other sets of light colors separately from controlling the first set of light colors.

8. The light source as recited in claim 1, wherein a quantum dot sheet is disposed on a surface of at least one light modulation tile in the one or more light modulation tiles.

9. The light source as recited in claim 1, wherein quantum dots are dispersed within at least one light modulation tile in the one or more light modulation tiles.

10. The light source as recited in claim 1, wherein the light source is configured to confine the first light within the light source and to emit the second light.

11. The light source as recited in claim 1, wherein the light source is configured to shine the second light through a diffuser.

12. The light source comprising:
one or more first light sources that are configured to emit first light comprising one or more first color components that occupy a first range that is beyond one or more prescribed ranges of light wavelengths; and
a light converter configured to be illuminated by the first light and to convert the first light into second light, the second light comprising one or more second color components that occupy a second range within the one or more prescribed ranges of light wavelengths, each of the one or more second color components in the second light having strengths monitored and regulated to produce a particular point within a specific color gamut,
wherein the light source is configured to shine the second light through a display panel.

13. The light source as recited in claim 1, wherein the light converter comprises an array of light conversion units and wherein each light conversion unit is configured to produce a part of a single color component in the second color components in the second light.

14. The light source comprising:
one or more first light sources that are configured to emit first light comprising one or more first color components that occupy a first range that is beyond one or more prescribed ranges of light wavelengths; and
a light converter configured to be illuminated by the first light and to convert the first light into second light, the second light comprising one or more second color components that occupy a second range within the one or more prescribed ranges of light wavelengths, each of the one or more second color components in the second light having strengths monitored and regulated to produce a particular point within a specific color gamut,
wherein the light converter comprises an array of light conversion units and wherein each light conversion unit is configured to produce a part of all color components in the second color components in the second light.

15. The light source as recited in claim 1, wherein the light converter comprises an array of light conversion units and wherein each light conversion unit is configured to produce a portion of the second color components in the second light.

16. The light source as recited in claim 1, wherein the light converter comprises an array of light conversion units and wherein intensities of one or more parts of one or more color components, from each light conversion unit, in the second light is monitored and regulated to produce the particular point within the specific color gamut.

17. The light source as recited in claim 1, wherein the light source is configured to operate within a range of temperatures and wherein the one or more second color components in the second light having strengths monitored and regulated to produce the particular point within the specific color gamut for any temperature in the range of temperatures.

18. The light source comprising:
one or more first light sources that are configured to emit first light comprising one or more first color components that occupy a first range that is beyond one or more prescribed ranges of light wavelengths; and
a light converter configured to be illuminated by the first light and to convert the first light into second light, the second light comprising one or more second color components that occupy a second range within the one or more prescribed ranges of light wavelengths, each of the one or more second color components in the second light having strengths monitored and regulated to produce a particular point within a specific color gamut,
wherein the specific color gamut comprises one of an Academy Color Encoding Space (ACES) color space, a Digital Cinema Initiative (DCI) color space, an International Telecommunication Union (ITU) color space, or a Reference Input/Output Medium Metric RGB Color Encodings (RIMM/ROMM RGB) color space.

19. The light source comprising:
one or more first light sources that are configured to emit first light comprising one or more first color components that occupy a first range that is beyond one or more prescribed ranges of light wavelengths; and
a light converter configured to be illuminated by the first light and to convert the first light into second light, the second light comprising one or more second color components that occupy a second range within the one or more prescribed ranges of light wavelengths, each of the one or more second color components in the second light having strengths monitored and regulated to produce a particular point within a specific color gamut,
wherein the light source is configured to illuminate zero, one, two or more display panels in a display system.

20. The light source comprising:
one or more first light sources that are configured to emit first light comprising one or more first color components that occupy a first range that is beyond one or more prescribed ranges of light wavelengths; and
a light converter configured to be illuminated by the first light and to convert the first light into second light, the second light comprising one or more second color components that occupy a second range within the one or more prescribed ranges of light wavelengths, each of the one or more second color components in the second light having strengths monitored and regulated to produce a particular point within a specific color gamut, wherein the light converter comprises quantum dots that cover one or more light valves and impart one or more different colors for the one or more light valves.

* * * * *